(12) United States Patent
Seaborn et al.

(10) Patent No.: US 12,250,314 B2
(45) Date of Patent: Mar. 11, 2025

(54) ATTRIBUTE BASED ENCRYPTION KEY BASED THIRD PARTY DATA ACCESS AUTHORIZATION

(71) Applicant: International Business Machines Corporation, Armonk, NY (US)

(72) Inventors: Mark Duane Seaborn, Algonquin, IL (US); Patrick Aaron Tamborski, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 18/109,129

(22) Filed: Feb. 13, 2023

(65) Prior Publication Data

US 2024/0275584 A1  Aug. 15, 2024

(51) Int. Cl.
*H04L 9/32* (2006.01)
*H04L 9/08* (2006.01)

(52) U.S. Cl.
CPC ............ *H04L 9/321* (2013.01); *H04L 9/0825* (2013.01); *H04L 9/0866* (2013.01); *H04L 9/3213* (2013.01)

(58) Field of Classification Search
CPC ...................................... H04L 9/321
See application file for complete search history.

(56) References Cited

U.S. PATENT DOCUMENTS 10,079,686 B2   9/2018  Camenisch et al.
10,546,141 B2   1/2020  Miquel et al.
11,140,146 B2  10/2021  Suraparaju
11,368,447 B2   6/2022  Deshpande et al.
2015/0278553 A1* 10/2015  Matsuda ............... H04L 9/0869
                                                     713/192
2015/0372997 A1* 12/2015  Lokamathe ........... H04L 63/062
                                                     713/171

(Continued)

FOREIGN PATENT DOCUMENTS

CN      114124407 A    3/2022
CN      114500089 A    5/2022

(Continued)

OTHER PUBLICATIONS

International Search Report and Written Opinion dated Mar. 27, 2024 for International Application No. PCT/EP2024/051198, 12 pages.

(Continued)

*Primary Examiner* — Bradley W Holder
(74) *Attorney, Agent, or Firm* — Stephen J. Walder, Jr.; Anthony M. Pallone

(57) ABSTRACT

Mechanisms are provided for computing resource access security in which a credential of a user agent is authenticated to determine if the user agent is associated with an entity for which an attribute based encryption (ABE) key is to be generated. If so, an ABE key is generated and provided which corresponds to a set of attributes of the entity. Token issuance logic receives a token request and the ABE key from a relying party computing device and executes a decryption operation on locking metadata associated with at least one attribute value based on the ABE key. The token issuance logic, in response to the decryption operation successfully decrypting the locking metadata, issues a generated token to the relying party computing device based on the at least one attribute value. The relying party computing device accesses the computing resources using the generated token.

25 Claims, 6 Drawing Sheets

(56) References Cited

U.S. PATENT DOCUMENTS

| | | | |
|---|---|---|---|
| 2016/0127353 A1 | 5/2016 | Thomas et al. | |
| 2019/0182045 A1 | 6/2019 | Ni et al. | |
| 2019/0394020 A1 | 12/2019 | Lepoint | |
| 2020/0259836 A1 | 8/2020 | Kumar | |
| 2021/0374265 A1* | 12/2021 | Gigov | H04L 63/0853 |
| 2021/0377051 A1 | 12/2021 | Pai | |
| 2022/0217000 A1 | 7/2022 | Seaborn | |
| 2023/0019301 A1 | 1/2023 | Yu et al. | |
| 2023/0138102 A1* | 5/2023 | Park | H04L 63/08 |
| | | | 713/171 |

FOREIGN PATENT DOCUMENTS

| | | |
|---|---|---|
| EP | 4002758 A1 | 5/2022 |
| TW | 201928753 A | 7/2019 |

OTHER PUBLICATIONS

Niwa, Yusuke et al., "Construction of a Multi-Domain Functional Encryption System on Functional Information Infrastructure", 2013 16th International Conference on Network-Based Information Systems, Sep. 4, 2013, 8 Pages.

Schanzenbach, Martin et al., "reclaimID: Secure, Self-Sovereign Identities using Name Systems and Attribute-Based Encryption", 2018 17th IEEE International Conference on Trust, Security and Privacy In Computing And Communications/12th IEEE International Conference On Big Data Science And Engineering, Aug. 1, 2018, 12 Pages.

International Office Action dated Sep. 3, 2024 for International Application No. 113100831, 9 pages. Machine Translated.

International Office Action/Notice of Allowance dated Oct. 30, 2024 for International Application No. 113100831, 6pages.

* cited by examiner

ATTRIBUTE BASED ENCRYPTION KEY BASED THIRD PARTY DATA ACCESS AUTHORIZATION

BACKGROUND

The present application relates generally to an improved data processing apparatus and method and more specifically to an improved computing tool and improved computing tool operations/functionality for providing attribute based encryption key based third party data access authorization.

Protocols have been developed to allow owners of data to grant access to that data to third parties for various purposes. For example, Open Authorization 2 (OAuth2) is a protocol that allows users to authorize access, and control access, to data they own on one site to third party sites for several data processing use cases. These use cases range from printing digital photographs the user stores at the site, e.g., in the cloud, to running analytics against data stored in data lakes, for example. OpenID Connect (OIDC) is an identity layer that operates on top of OAuth2. With OIDC, an additional token, referred to as the ID token, is added that identifies the user that is granting access to the data.

While OIDC and OAuth2 provide protocols to control access to data, these tools are still subject to issues from attackers should the authentication server of these protocols be successfully compromised. That is, if compromised by an attacker, the attacker may have access to the authentication tokens and the authentication server authentication protocols giving them access to protected computing resources. This provides a significant computer security issue.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for computing resource access security. The method comprises authenticating, by authentication and authorization logic of the data processing system, a credential of a user agent to determine if the user agent is associated with an entity for which an attribute based encryption (ABE) key is to be generated. The method further comprises generating, by the authentication and authorization logic, in response to determining that the user agent is associated with the entity for which an ABE key is to be generated, the ABE key and providing the ABE key to the user agent, wherein the ABE key corresponds to a set of attributes of the entity. The method also comprises receiving, by a token issuance logic of the data processing system, a token request and the ABE key from a relying party computing device, and executing a decryption operation, by the token issuance logic, on locking metadata associated with at least one attribute value, based on the ABE key. The method also comprises issuing, by the token issuance logic, in response to the decryption operation successfully decrypting the locking metadata, a generated token to the relying party computing device based on the at least one attribute value. The relying party computing device accesses the computing resources using the generated token. Thus, with this methodology, rather than requiring authorization code mappings, ABE key mechanisms allow for determination of attribute values to include in issued tokens without requiring explicit provider maintained authorization code mappings with attributes.

In some illustrative embodiments, the method further comprises provisioning the token issuance logic with attributes and corresponding candidate attribute values as attribute-value pairs. Each candidate attribute value of each attribute-value pair is associated with a corresponding locking metadata. Thus, with these illustrative embodiments, the locking metadata is associated with each candidate attribute value and if that candidate attribute value's associated locking metadata is able to be decrypted, then the candidate attribute value may be used to generate the issued token.

In some illustrative embodiments, provisioning the token issuance logic with attributes and corresponding candidate attribute values comprises storing, in an attribute-value data structure, a plurality of attribute names; storing, in the attribute-value data structure, for each attribute name in the plurality of attribute names, a list of candidate attribute values for the attribute name; and storing, in the attribute-value data structure, for each candidate attribute value in each list of candidate attribute values for each attribute name, a corresponding locking metadata that is encrypted such that only ABE keys of authorized user agents corresponding to the candidate attribute values can decrypt the corresponding locking metadata. Thus, with these illustrative embodiments, the locking metadata and the ABE key mechanism permits an inherent determination of which attribute values to include in issued tokens based on whether the ABE key is able to decrypt the locking metadata associated with the attribute-value pair.

In some illustrative embodiments, the locking metadata is an arbitrary sequence of bytes that is encrypted such that a valid ABE key decrypts the locking metadata. In these illustrative embodiments, the locking metadata contents are not important to the locking functionality as the determination is whether the locking metadata is able to be decrypted successfully or not, regardless of the particular contents of the locking metadata. Thus, the locking metadata may be any arbitrary sequence of bytes.

In some illustrative embodiments, the locking metadata is an attribute-value pair corresponding to the locking metadata, which is encrypted such that a valid ABE key decrypts the locking metadata. In these illustrative embodiments, the attribute-value pair is further obfuscated by the encryption and use of the attribute-value pair as the locking metadata. Thus, where other illustrative embodiments may have the attribute-value pair in plaintext with associated locking metadata, in these illustrative embodiments, the attribute-value pair is also encrypted, leading to greater security.

In some illustrative embodiments, the method further comprises provisioning the authentication and authorization logic with a plurality of master ABE keys, wherein the ABE key is generated based on a corresponding master ABE key in the plurality of master ABE keys. In some illustrative embodiments, each master ABE key is associated with a different computing resource owner, and wherein ABE keys, generated based on a first master ABE key associated with a first provider of computing resources, cannot decrypt locking metadata corresponding to ABE keys generated based on a second master ABE key associated with a second computing resource owner. In these illustrative embodiments, different owners of computing resources may maintain their own master ABE keys for issuing ABE keys such that they may have separate security policies and ensure that their computing resources are not able to be accessed using ABE keys issued based on other resource owner's master ABE keys.

In some illustrative embodiments, the ABE key is a ciphertext and each locking metadata associated with each attribute value in the at least one attribute value comprises a corresponding second ABE key. In some illustrative embodiments, executing the decryption operation comprises attempting to decrypt the ciphertext of the ABE key with each locking metadata associated with each attribute value in the at least one attribute value. In some illustrative embodiments, issuing the generated token comprises generating the generated token by incorporating one or more attribute values of the at least one attribute value in the generated token in response to the corresponding second ABE keys of the one or more attribute values successfully decrypting the ciphertext. Thus, in these illustrative embodiments, rather than attempting to decrypt the locking metadata based on an issued ABE key, a ciphertext may be provided to the relying party and the ABE keys of the locking metadata may be used to attempt to decrypt the ciphertext.

In some illustrative embodiments, issuing the generated token comprises generating the token at least by including, in the token, the at least one attribute value in response to the decryption operation being successful. In some illustrative embodiments, the token is one of an access token or an ID token. The access token or ID token may be used with other OAuth2/OIDC based mechanisms to gain access to the protected computing resources. In some illustrative embodiments, the token is a JavaScript Object notation Web Token (JWT) and the at least one attribute value comprises at least one claim of the JWT. Thus, in these illustrative embodiments, the security of the token issuance mechanisms is improved while still being able to be used with OAuth2/OIDC based mechanisms and JWTs.

In some illustrative embodiments, the authentication and authorization logic is a first microservice executing on a first computing device of the data processing system, and wherein the token issuance logic is a second microservice executing on one of the first computing device or a second computing device different from the first computing device. Thus, in these illustrative embodiments, the microservice architecture facilitates distribution of the functionality of the authentication and authorization logic and token issuance logic to different computing devices which increases the security of the system against compromise.

In some illustrative embodiments, the method comprises provisioning the token issuance logic with attributes and attribute values that are candidates for inclusion in tokens as candidate attribute-value pairs and provisioning the authentication and authorization logic with a master ABE key from which to generate ABE keys. In some illustrative embodiments, issuing the generated token to the relying party computing device based on the at least one attribute value comprises generating the token to include the at least one attribute value from a subset of the candidate attribute-value pairs, and wherein the ABE key is generated based on the master ABE key. Thus, not all candidate attribute-value pairs are used in each token and the token issuance logic may be pre-configured with attribute-value pairs from which selected attribute values are used to generate tokens.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
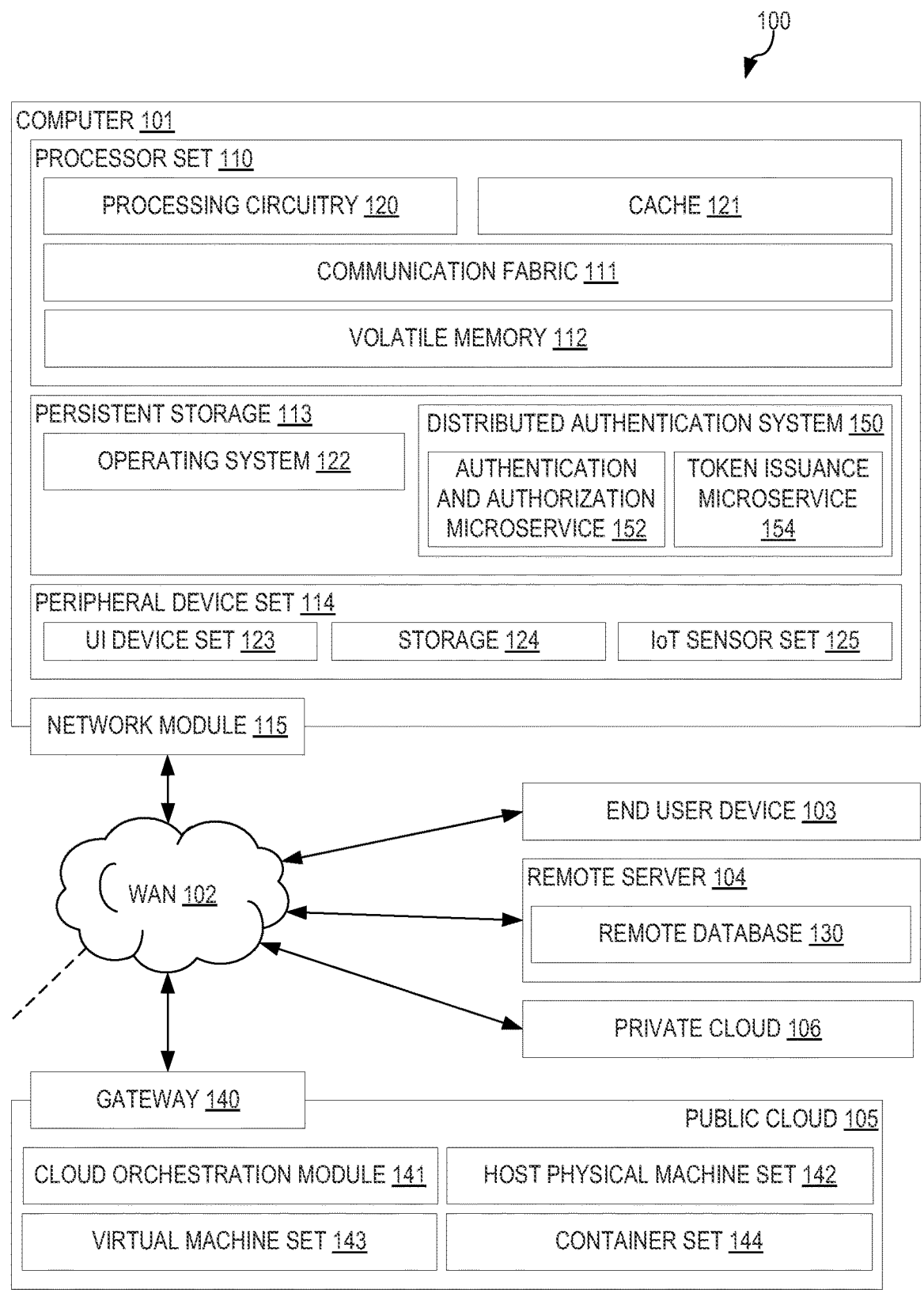
FIG. 1 is an example diagram of a distributed data processing system environment in which aspects of the illustrative embodiments may be implemented and at least some of the computer code involved in performing the inventive methods may be executed.

As noted above, protocols have been developed, such as Oauth2 and OIDC, which allow entities to control access, by third parties, to their digital content and other computing resources that operate both as authentication token issuing entities and authentication systems. However, should the authentication server be successfully compromised by an attacker, the authentication tokens and the authentication protocols may be compromised, and unwanted parties may gain access to protected computing resources leading to a significant computer security issue. It would be beneficial to hide the policies, rules, attributes, etc. used to generate authorization codes and authentication tokens that are required to gain access to the protected computing resources.

The illustrative embodiments provide an improved computing tool and improved computing tool functionality/operations that implement attribute-based encryption key authorization of third party access to computer resources, e.g., applications, data structures, or the like. Attribute-based encryption (ABE), originally referred to as Fuzzy Identity-Based Encryption, is a public key-based authentication scheme that enables fine-grained access control of encrypted data using security authorization policies in which the secret key of a user, and the ciphertext, are dependent upon attributes, e.g., email address, country of residence, type of subscription or account that they have, etc. The decryption of a ciphertext in ABE is possible only if the set of attributes of the user key match the attributes of the ciphertext. Thus, only users that satisfy certain access protocols can access the decrypted plain text of the ciphertext. ABE permits a 1-to-many type of encryption, i.e., multiple private or secret keys may be generated based on the same public key.

For example, assume that a person wishes to generate a confidential document that is to be shared with members of a workgroup in a company. Under identity-based cryptography, the person would have to create multiple encrypted versions of this document for each potential recipient. However, using ABE, the document can be encrypted with a public key that is generated based on a set of attribute values, and specify a key issuance policy, that is implemented by the key generator, that anyone having a particular set of attribute values, can be provided a secret or private key to decrypt the encrypted confidential document. For example, assume that the attributes are Location, Department, and Workgroup, and that the policy states that the confidential document is only to be accessible by individuals that have attribute values of Location being the "United States", the Department being "Cloud Computing Solutions", and the Workgroup being "XYZ Platform". The confidential document is encrypted using these specific attribute values to generate the public key encrypted confidential document. When a user wishes to access the encrypted document, the user requests a key from the key generator and presents their credentials, which includes their Location, Department, and Workgroup. The key generator implements the defined security policy or policies for the encrypted document, and determines whether or not to issue a decryption key to the user. If the user's credentialed attribute values match the conditions of the security policy, then the user is presented with a decryption key that they can use to decrypt the encrypted confidential document.

With the illustrative embodiments, ABE is implemented to provide an ABE key as part of a mechanism for authorization which replaces opaque authorization codes in computer resource access flows. The ABE key is used to decrypt metadata that is associated with attributes to be placed in a token used to authenticate parties as part of the computer resource access operation, such as for Internet web applications. The ABE key mechanism embeds the authorization policy or policies in the ABE key itself by virtue of the entity (or party) having the ABE key, i.e., the ABE key is only issued to entities (parties) that meet the requirements of the security policy as defined in the key generator, which requires that the entities (parties) have one or more specific attribute values as defined in the policy or policies. With the illustrative embodiments, the attribute values that are to be included in an authentication token for use in authenticating a user may themselves be encrypted by way of a piece of encrypted metadata, such that an ABE key may be used to decrypt the attribute value. Because of the ABE mechanisms, if a party is able to decrypt the metadata associated with an attribute value, the fact that the metadata is successfully decrypted indicates that the corresponding attribute value is to be included in the authentication token. Thus, by using ABE keys and mechanisms to determine which attribute values to include in the access token, rather than using opaque authorization codes, providers do not need to maintain the attribute values and map the attribute values to authorization codes. Instead, the work of determining what attribute values to include in authentication tokens may be offloaded to microservices in accordance with the illustrative embodiments.

For example, the authentication token may be a JavaScript Object Notation (JSON) Web Token or the like, where JSON is a language independent open standard file format and data interchange format that uses human-readable text to store and transmit data objects consisting of attribute-value pairs and arrays, or other serializable values. For purposes of the following description, it will be assumed that the computer resources being accessed are data structures, but this is not intended to be limiting, and the mechanisms of the illustrative embodiments may be used to control access to any computer resource suitable to the particular implementation, such as applications or the like.

Using the JSON Web Token (JWT) as an example, the attributes associated with the metadata can be any attribute defined in the JWT, such as claims or scopes. Claims of a JWT are use case specific, but in general will specify characteristics of the entity requesting access to the computer resources, e.g., the identity of the issuing party, a validity time period, what access permissions are being granted to the entity, etc., where the entity may be a user, an application, or organization, or any other entity that can request access to computing resources and whose identity and authorization can be authenticated through cryptographic security mechanisms. Scopes of a JWTs are groupings of claims. JWT is an open standard used to share security information between parties, such as a server and a client, where the claims of the JWT cannot be altered, as the JWT is cryptographically signed. While JSON and JWT will be used herein as examples, it should be appreciated that other electronic data interchange (EDI) standards, using other types of tokens for sharing securing information between parties, may be used with the illustrative embodiments without departing from the spirit and scope of the present invention. For example, other formats of tokens may be used that include comma separated string formats, Extensible Markup Language (XML) formats, etc.

The ABE key based authentication mechanisms of the illustrative embodiments provide a secure microservice environment in which policies and rules used to create tokens/authorization codes do not necessarily need to be shared via some other flow as they are embedded in the ABE key mechanisms. A microservice is a cloud-native architectural approach in which a single application is composed of many loosely coupled and independently deployable smaller components, or services. These services have their own technology stack, inclusive of the database and data management model, communicate with one another over a combination of Application Programming Interfaces (APIs), event streaming, and message brokers, and are organized by business capability, with the line separating services often referred to as bounded context.

In accordance with one or more illustrative embodiments, the authentication mechanisms are separated into an authentication microservice and a token issuance microservice. These two microservices are provisioned with data for token issuance, but do not necessarily need to be connected to the same database to securely issue tokens. The two microservices are provisioned with data and rules for access token (meant to be read by the computing resource server to specify permissions granted to the protected computing resources) and ID token (meant to be read by the OIDC client and used to identify the resource owner) issuance. In a first provisioning operation, the token issuance microservice is provisioned with attributes and attribute values to include in the access token and ID token. The attributes and attribute values may be stored as attribute-value pair metadata, where the attributes may be JWT attributes, and the values may be any suitable values for those corresponding attributes, e.g., subscriber=admin, applicationname=app1, version=1.0.0, tier=top, etc.

The attribute-value pair may have an associated piece of metadata, which may be any small, encrypted data structure that will be used to test if a provided ABE key contains one or more attribute values that allow the presenter of the ABE key to acquire an access token and ID token. This metadata may be, for example, any arbitrary sequence of bytes, as the content of the metadata is irrelevant to the "locking" function it serves as part of the ABE key mechanism. That is, as long as the ABE key can be used to decrypt the metadata, the fact that the decryption itself is performed successfully is an indicator that the corresponding attribute value should be included in the corresponding issued access token or ID token. In some cases, the encrypted metadata may be the attribute value itself, or attribute-value pair itself, rather than the arbitrary sequence of bytes. For purposes of this description, this encrypted metadata used to lock the attribute values or attribute-value pairs is referred to herein as "locking metadata".

The content of the locking metadata is discarded after the attempt to decrypt the locking metadata. It is only used as the access control method for adding attribute value pairs to the token, e.g., JWT. In some illustrative embodiments, the attribute name may point to a list of values with accompanying locking metadata that is used test for which attribute value the attribute should contain or if multiple values should be included. That is, the ABE key may be used to decrypt one or more pieces of locking metadata in the list of values and the corresponding values associated with the decrypted pieces of locking metadata may be included in the issued token.

In a second provisioning operation, the authentication and authorization microservice (AAMs) is provisioned with a master ABE key. The master ABE key is provisioned on the AAM so that it can generate ABE keys (see Step 7 of FIG. 3). A plurality of AAMs may be present and operate with the token issuance microservice, with each instance of the AAM being associated with a corresponding resource owner, or user agent of a resource owner. Each resource owner may protect the master ABE key on their AAM according to their own security policies. Each resource owner may issue ABE keys that may be consumed by a single token issuance microservice that supports all of the resource owners. Each resource owner's token issuance security policies or rules may still be protected with appropriate encryption, as well as the resource owner's attribute-value pairs, where these data can only be unlocked with a ABE key from the resource owner that owns the locking metadata and the master ABE key. ABE keys issued by one resource owner cannot decrypt locking metadata of other resource owners because the ABE keys are generated by a different master ABE key.

In some illustrative embodiments, the ABE key sent from the relying party can also be replaced with a ciphertext. In these illustrative embodiments, the locking metadata may itself be replaced with an ABE key. Thus, in these illustrative embodiments, the test becomes attempting to decrypt the ciphertext with each ABE key associated with each of the attribute values, however, the overall mechanics described above are similar.

As mentioned above, in some illustrative embodiments, the token issuance microservice is provisioned with a list of encrypted locking metadata, wherein in some cases the encrypted locking metadata may comprise encrypted key value pairs for the access token. If the encrypted locking metadata can be decrypted with the ABE key presented by the relying party, the key-value pair is added to the access token, e.g., JWT. Thus, unlike the illustrative embodiments where the encrypted locking metadata are arbitrary sequences of bytes, the encrypted locking metadata of these illustrative embodiments are encrypted versions of the key-value pairs (attribute name/value). This approach has the advantage of hiding both the attribute key (name) and its value from attackers that can penetrate the authentication server. The access token (e.g., JWT) attributes can be anything from claims, scopes, or any other data the implementer wants to include in an access token, e.g., JWT, without departing from the spirit and scope of the present invention.

In OAuth2 and OIDC, the opaque authorization codes, which require each provider to maintain a mapping of authorization codes, provide proof of authentication and are exchanged by the OIDC clients for actual authentication tokens, which contain any cryptographically signed claims that are asserted about the identity. Opaque authorization codes inherently hold no meaning and have no metadata contained within. Any rules/policies are mapped in the token issuing service.

The mechanisms of the illustrative embodiments replace the authorization code in the data access flow with an ABE key/ciphertext mechanism. The illustrative embodiments have the following advantages. First, the mechanisms of the illustrative embodiments improve the ability to move token issuance functionality to a separate computing service from the authentication and authorization service, and reduce the load on the user authentication mechanism, easing the migration of monolithic Authentication Server applications to a microservice architecture for scalability and security. Second, the mechanisms of the illustrative embodiments allow enterprise rules and attributes, such as identities or group membership, to be anonymized and hidden within the ABE key used in place of the authentication code.

Third, the mechanisms of the illustrative embodiments enable parties to hide enterprise rules from the token issuance computing service itself, improving the security of the authentication system should the token issuance computing microservice be compromised. With an ABE key, the rules/policies do not need to be known by the token issuing service at all. Thus, if the token issuing service is compromised, those rules/policies are still hidden with the mechanisms of the illustrative embodiments. When the token issuance computing microservice makes decisions as to what JWT claims (e.g., attributes/values) are added to tokens, the token issuance computing microservice simply tries to decrypt the locking metadata associated with the JWT claim (attribute value), instead of needing complex database queries to find JWT attributes for the presenter, as in the case of authentication codes used by authentication servers, e.g., OAuth2/OIDC authentication servers.

Thus, the illustrative embodiments provide an improved computing tool and improved computing tool functionality/operations that provide an ABE key (or ciphertext in some illustrative embodiments as described hereafter) instead of an opaque authorization code. The ABE key embeds the rules/policies, in which attributes that are associated with the ABE key are specified as part of a set of well-defined cryptographic functions that provide a high degree of security, while enabling clean separation of token issuance and authentication services. That is, the ABE key is issued to user agents of authorized entities based on their attributes.

The locking metadata is encrypted using a set of rules/security policies that specify criteria of attributes of entities, such that the ABE keys of entities having those attributes will be able to decrypt corresponding locking metadata with the ABE key. For example, assume that a set of attributes is {A, B, C, D} and a first entity receives an ABE key that corresponds to attributes {A, B}. Also assume that a second entity receives an ABE key that corresponds to attributes {C, D}. If the locking metadata is encrypted with a security policy of "(A and C) or D", then the second entity's ABE key will be able to decrypt the locking metadata, but the first entity's ABE key will not be able to decrypt the locking metadata. Hence, the ABE key mechanism implicitly implements the security policy without having to have an explicit mapping of authentication codes. Moreover, by associating the locking metadata with specific candidate attribute-value pairs, the corresponding attribute-value pairs that have their locking metadata decrypted by the ABE key may be automatically integrated into the issued tokens.

It should be appreciated that while the illustrative embodiments are described with reference to JWTs and OAuth2/OIDC as examples, the illustrative embodiments are not limited to such. Rather, the mechanisms of the illustrative embodiments may be implemented with any token issuing protocol and any suitable type of token and corresponding token attributes and attribute values, represented in any suitable manner for the implementation, e.g., the invention is not limited to attribute-value pair data structures. The illustrative embodiments are provided as examples, and those of ordinary skill in the art will recognize that many modifications to these examples may be made in view of the present description, without departing from the spirit and scope of the present invention.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The illustrative embodiments provide an improved computing tool and improved computing tool functionality/operations that are specifically directed to solving issues arising in the computer arts, and specifically the above-identified problems associated with monolithic authentication server architectures being compromised by attackers and gaining access to protected computing resources. The illustrative embodiments provide a specific solution to these problems in the form of an attribute-based encryption (ABE) key system for token issuance and authentication of entities which permits separation of the authentication and token issuance services as well as obfuscation of security policies and attributes used in these security policies. The illustrative embodiments may be implemented as part of a computer security system that protects computing resources, and may be implemented in a distributed data processing system to control access by multiple entities to a protected set of computing resources via one or more data networks. Thus, an example distributed data processing system, e.g., a cloud computing environment, in which aspects of the illustrative embodiments are implemented in one or more computing devices of the distributed data processing system will first be described followed by a description of the specific improved computing tool components and functionality.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool.

In particular, the improved computing tool of the illustrative embodiments specifically provides an authentication server computing tool, which may be a distributed authentication server computing tool, in which attribute based encryption (ABE) replaces authentication codes in a manner that obfuscates the security policies and attributes used to authenticate users for accessing computing resources and which distributes the functionality to make attacks on the system unable to access the protected computing resources. The improved computing tool implements mechanism and functionality, such as an authentication server in which the authentication and authorization logic (which may, but is not limited to, a microservice implementation) is separated from the token issuance logic (which again may be a microservice implementation, but is not required to be a microservice). These mechanisms provide specific computer logic which cannot be practically performed by human beings either outside of, or with the assistance of, a technical environment, such as a mental process or the like. The improved computing tool provides a practical application of the methodology at least in that the improved computing tool encodes rules/policies about authentication within the ABE key which obfuscates the rules/policies from the token issuing computing functionality. In addition, the improved computing tool provides a practical application of the methodology at least in that the improved computing tool is able to separate out authentication and authorization computer functionality from token issuance computer functionality to thereby distribute the authentication server, rather than using a monolithic authentication server that is susceptible to compromise. In addition, the improved computing tool provides a practical application of the and which does so using attribute based encryption that obfuscates the policies and attributes used to authenticate third parties accessing protected computing resources.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as distributed authentication system 150 having microservices, e.g., authentication and authorization microservice 152 and token issuance microservice 154. It should be appreciated that while FIG. 1 shows these microservices 152, 154 as being provided on the same computing device 101, these microservices may be distributed to different physical and/or virtual machines having different hardware/software resources such that compromising of one microservice does not affect the other microservice. In some illustrative embodiments, components of the distributed authentication system 150 may be distributed to other remote computing devices, such as remote server 104 or another computing device that may be accessible via one or more data networks 102 (as represented by the dashed line). For example, the authentication and authorization microservice 152 may be provided on computer 101, in which case the computer 101 will be a server computing device, for example, while the token issuance microservice 154 may be provided on remote server 104 or another server computing device coupled to the WAN 102. The operation of the distributed authentication system 150 will be described in greater detail hereafter with regard to FIGS. 3-5.

It should be appreciated that distribution of these services across physical/virtual machines is an optional element of the illustrative embodiments. A combined code and token issuing service may still benefit from the improved computing functionality providing ABE keys as described herein, as any mapping between the authentication and token issuance mechanisms is embedded in the ABE key mechanisms. If these services are distributed, the additional benefit is that the rules/policies do not have to be shared across the AAM and token issuing service. Thus, where an authentication server and token issuing service would otherwise need some way to note how the authorization code maps to the claims to be inserted into the token, the illustrative embodiments, whether distributed or not, provides a clear and secure way to solve that problem using ABE keys/ciphertexts.

In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

In general, computer 101 may take the form of a server computer, desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. That is, in a distributed computing environment 100, various types of computing devices may be provided that communicate via one or more data networks. For purposes of the description of the illustrative embodiments, the computer 101 will be assumed to be a server computing system providing the distributed authentication system 150 having authentication and authorization microservice 152 and token issuance microservice 154 (again, microservice architecture is not required, but is used herein as an example). As a server computing system, the computer 101 may not implement all of the elements shown, but these elements are provided herein to illustrate components of a computing system in which aspects of the illustrative embodiments may be implemented in some illustrative embodiments. The server computer 101 provides the distributed authentication system 150 for performing authentication and authorization computer functionality and token issuance functionality between end user devices and various other services available through the one or more data networks, e.g., the cloud, such as providing end-user to service authorization and service-to-service authorization functionality.

As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As will be described hereafter, the distributed authentication system 150 provides an authentication and authorization microservice 152 and a token issuance microservice 154. These mechanisms operate using attribute based encryption (ABE) and ABE keys instead of opaque authorization codes. This permits the authentication and authorization service to implement security policies that are embedded into the ABE key by virtue of the ABE mechanisms. The authentication and authorization service may determine whether or not to generate and issue an ABE key to a third party entity, assumed hereafter to be a user, but could be any requesting entity, e.g., an application or specific device, based on the established security policy. The ABE key is used to decrypt locking metadata associated with attribute values to determine which attribute values to include in an access token/ID token. The ABE key is submitted with a token request to the token issuance microservice in order to obtain an access token and ID token, with attribute values that correspond to the attribute values whose locking metadata are able to be decrypted. The access token and ID token may then be used to request access to the protected computing resources.

This exchange of messages for performing this ABE based authentication and authorization involves a plurality of different parties including the requesting entity, e.g., user, a relying party, e.g., the application that is delegating authentication services to the authentication server, the authentication system, and a protected computing resource provider, e.g., a resource server or the like. These entities can be associated with different computing devices that communicate with each other via data communication channels over one or more data networks, such as WAN 102. Thus, for example, a user agent (e.g., a user's computing device, application executing on a user's computing device, or the like) may be provided as part of the end user device 103, a relying party may be provided as part of a remote server 104 or other server computing device (not shown, but indicated by the dashed line), the distributed authentication system 150 may be part of the computer 101 or distributed across multiple computing devices, and the protected computing resource provider may be provided as part of the remote server 104 or other server computing device, and provides computing resources, such as hardware/software computing resources or data structures, e.g., database 130.

As shown in FIG. 1, one or more of the computing devices, e.g., computer 101 and/or remote server 104, may be specifically configured to implement a distributed authentication system 150, which may be distributed, having separate authentication and authorization microservice 152 and token issuance microservice 154. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates attribute based encryption (ABE) key based token issuance for authentication of third party entities to access protected computing resources which support distribution of authentication and token issuance microservices and obfuscation of security policies and attributes used to authenticate third party entities.

The data flow implemented and orchestrated by the distributed authentication system 150 will now be described to thereby illustrate the improved computer functionality of the improved computing tool. In order to better understand this improved computer functionality, it is first beneficial to have an understanding of the data flow of an OAuth2/OIDC monolithic authentication server based architecture in order to see the differences between this OAuth2/OIDC architecture and that of the illustrative embodiments.

Figure 2:
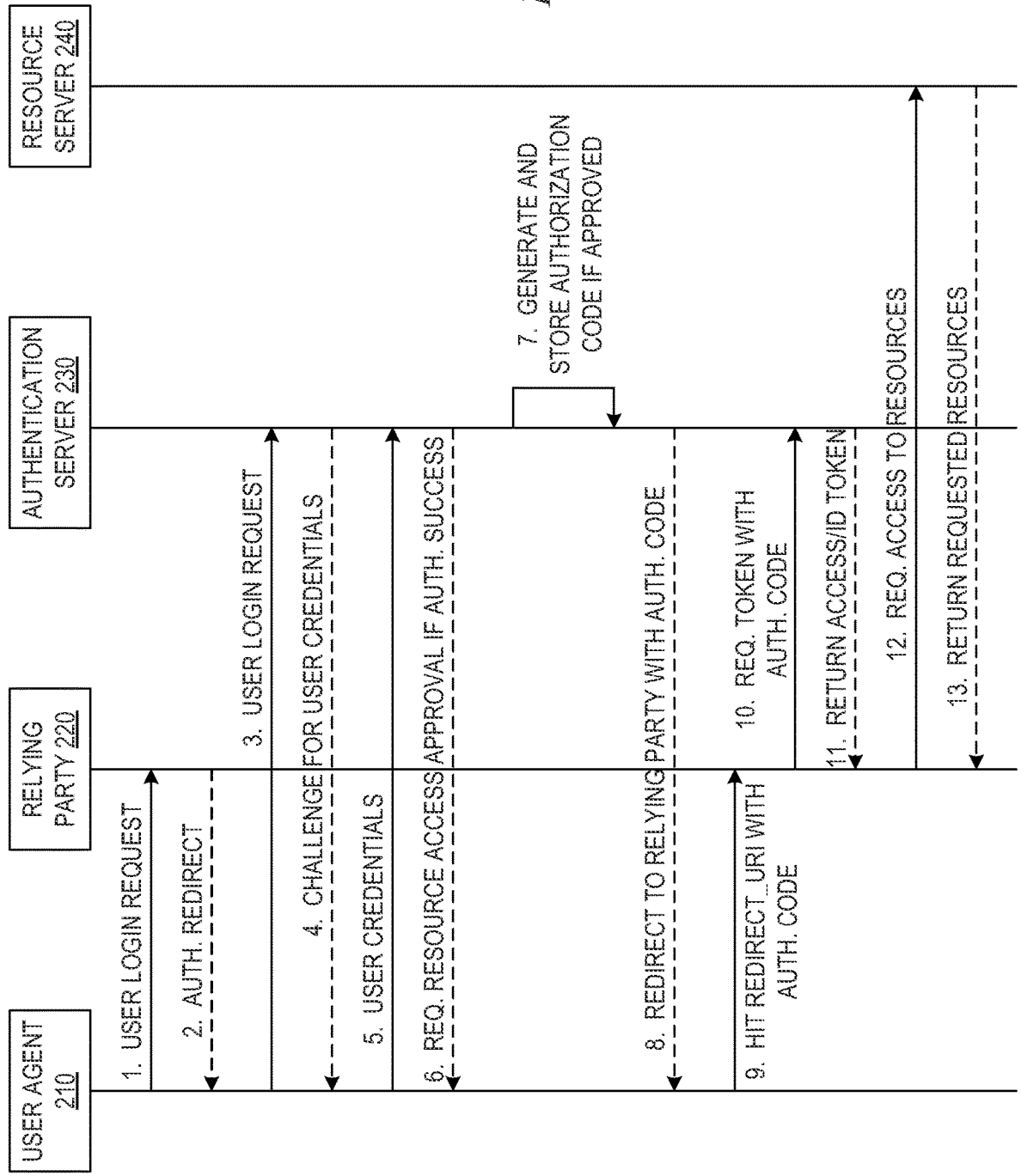
FIG. 2 is an example data flow diagram illustrating an operation of an OAuth2/OIDC architecture.

FIG. 2 is an example data flow diagram illustrating an operation of an OAuth2/OIDC architecture. The architecture includes four main parties: the user agent 210, the relying party 220, the authentication server 230, and the resource server 240. The user agent 210 is also sometimes referred to as the resource owner and may be the application user, or end user, that owns the protected computing resource, e.g., if the protected computing resource is a data structure, then the data structure stores the data that is personal to the resource owner, e.g., a user's profile or the like. The resource owner can grant or deny access to the protected computing resources that they own, e.g., an application may call an external system application programming interface (API) to obtain a user's personal information from a user profile. The profile data is the protected computing resource that the resource owner owns on the external system, and the resource owner can grant or deny an applications' request to access their user profile.

The relying party 220 may also sometimes be referred to as a client, and is the application requesting access to a protected computing resource on the resource server 240. For example, the client may be a web application running on a server, an application running on a web browser of a client computing device, a web API that calls another web API, or the like. The resource server 240 provides access to the resource owner's protected computing resources, e.g., protected data structures. The resource server 240 may be a web API or application, for example, that provides an interface for accessing a data store, e.g., database or the like. The resource server 240 uses the authorization server 230 to control access to these protected computing resources by performing authentication of requests, and providing security tokens to grant/deny access to the protected computing resources.

The authorization server 230 is a computing platform that securely handles the resource owner's (user agent 210) protected computing resources. The authorization server 230 is responsible for issuing the security tokens that applications and APIs used to grant, deny, or revoke access to resources after the resource owner has been authenticated and signed in. The security tokens issued by the authorization server 230 include access tokens and ID tokens (collectively referred to as bearer tokens). Access tokens are issued by the authorization server to the relying party 220 which uses these tokens with the resource server 240 to access protected computing resources. The access tokens contain permissions that the authorization server 230 has granted to the relying party 220. ID tokens are issued by the authorization server 230 to the relying party 220 which uses these ID tokens when signing in users to obtain information about these users, e.g., user agent 210.

When registering with the authentication server 230, the user agent 210 is given a unique identifier, e.g., an application ID or client ID, that identifies the user agent 210 to the authentication server 230. In addition, the authorization server 230 uses a redirect Uniform Resource Identifier (URI) to direct the user agent 210 to the resource server 240 to complete the access to protected computing resources.

As shown in FIG. 2, the operation starts with a user agent 210, e.g., an application executing on a computing device, e.g., user's application, web browser, mobile application, etc., sending a user login request (step 1) to a relying party 220. It should be appreciated that references to "party" or "parties" in this description are intended to be referencing the computing devices used by these parties, as the data flows are between computing devices. The relying party 220 responds (step 2) with an authentication redirect to the user agent 210 which then submits the user login request (step 3) to the authentication server 230 based on the authentication redirect redirecting the user agent 210 to the authentication server 230.

The authentication server 230 sends (step 4) a challenge for user credentials to the user agent 210 which then responds with the user credentials (step 5). Based on the user credentials, the authentication server 230 determines whether or not the user agent 210 should be issued an authorization code. This determination may be based on a set of stored rules and a determination of whether those rules are satisfied by the credentials submitted by the user agent 210. If an authorization code is generated (step 7) and issued by the authentication server 230, the authentication server 230 stores the authentication code as part of a mapping between the attributes, which may be provided by the user when registering with the authentication server 230, of the user agent 210 and the authentication code. For example, the attributes may be a user name, phone number, email, address, or any other data that can be asserted about an identity. The authentication server 230 must be able to map the authorization code it previously issued upon successful authentication back to the identity when the relying party exchanges the authorization code for a token. Thus, the authorization code is mapped to a set of attributes which represents an identity. Authorization codes are typically one time use to prevent replay attacks.

Thus, the authentication server 230 stores this mapping and hence, if the authentication server 230 is compromised by an attacker, the attacker may access this mapping and be able to spoof the identity of an authorized third party entity, e.g., user agent 210, in order to gain access to protected computing resources. The authentication code is referred to herein as "opaque" because it is intended for use specifically by the authentication server 230 and requires that the authentication server 230 maintain a mapping between the authentication code and the attributes of the user agent 210 (or user), in order to be able to later authenticate the authentication code and provide an access token and ID token for accessing the protected computing resources. The authentication code is also "opaque" in that the structure of the token is determined on a provider-by-provider basis.

The authentication server 230 sends a request to the user agent 210 for resource access approval if the authentication of the user agent 210 based on the user credentials is a success (step 6). Assuming that the authentication server 230 authenticates the user credentials successfully, the authentication server 230 generates and stores the authorization code in a mapping with the user agent 210 (or user) attributes (step 7) and sends a redirect to the user agent 210 redirecting the user agent 210 to the relying party 220 and providing the authorization code that was generated (step 8).

The user agent 210 then, based on the redirect URI sends the authorization code to the relying party 220 (step 9). The relying party 220 sends a request token with the authorization code to the authentication server 230 (step 10) which authenticates the authorization code based on its stored mapping data structure and returns an access token and ID token (step 11). The relying party 220 then sends an access request (step 12) to the resource server 240 with the access token and ID token. The resource server 240 then returns the requested resources to the relying party (step 13) which can then perform its operations on the protected computing resources that are provided to the relying party 220.

That is, resource servers 240 accept access tokens as valid credentials for protected resource access. In OIDC, which is identity on top of OAuth2, the ID token asserts claims about the individual. Only an access token is required to access protected resources on a third party resource server 240. The ID token is intended to be processed by the relying party 220 so that the relying party 220 can identify whom it is requesting resources for. A real world example of why this is needed is if a first application wants to parse a user's messages in another second application. A user could log into the first application, the first application would defer authentication to the second application, the second application would indicate that the first application is requesting to read the user's messages, and request authorization of this access. Then, both the access and ID tokens from the second application are returned to the first application. The first application uses the ID token to present a personalized look and feel (and perhaps to show a profile page for the user) and uses the access token against the second application's resource server to read the user's messages.

As shown in FIG. 2, the authentication server 230 provides a monolithic authentication/authorization and token issuing server. Thus, if this server is compromised, an attacker may gain access to the authorization codes, tokens, permissions, security rules, etc., that are utilized to access protected computing resources. Hence, the attacker, if able to compromise the authentication server, can gain access to protected computing resources.

Figure 3:
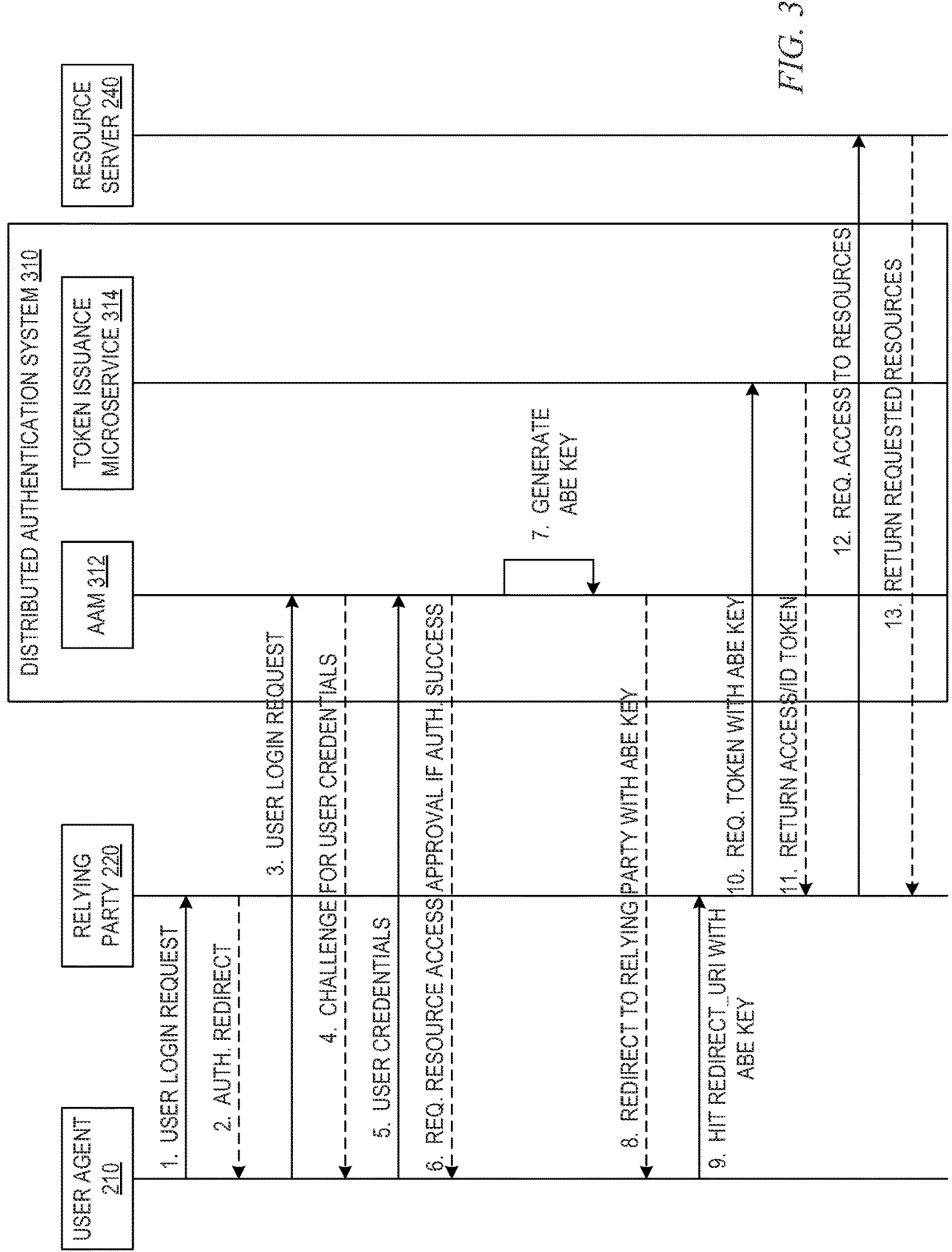
FIG. 3 is an example data flow diagram illustrating an operation of a distributed authentication system in accordance with one illustrative embodiment.

FIG. 3 is an example data flow diagram illustrating an operation of a distributed authentication system in accordance with one illustrative embodiment. FIG. 3 has similar parties and data flows to FIG. 2, which are indicated by similar reference numerals and descriptive text labels. However, notably, the authentication server 230 is replaced with a distributed authentication system 310 in which the authentication and authorization functionality and the token issuance functionality are distributed to an authentication and authorization microservice (AAM) 312 and a token issuance microservice 314, which may be implemented on different computing hardware and software of the same or different computing devices. The microservices 312 and 314 are distributed such that compromise of one does not result in compromising the other, e.g., these microservices do not share security policies or rules and the attributes used by such policies and rules cannot be accessed from the encrypted objects and ABE key. While FIG. 3 shows a microservice architecture, and a distributed architecture, again the illustrative embodiments are not limited to such, and other architectures that implement the ABE key mechanisms of the illustrative embodiments may be used without departing from the spirit and scope of the present invention.

In addition to the distributed authentication system 310, the data flow shown in FIG. 3 replaces the authorization code mechanisms used in steps 7 and thereafter with an attribute based encryption key and corresponding operations that operate based on the ABE key as will be discussed hereafter. Thus, steps 1 through 6 of FIG. 3 are performed in a similar manner to the OAuth2/OIDC architecture based data flow of FIG. 2. Moreover, steps 12-13 for accessing the protected computing resources on the resource server 240 are similar to steps 12-13 of FIG. 2.

As shown in FIG. 3, after step 6, in step 7, the authentication and authorization microservice (AAM) 312 applies security policies to determine whether to issue an ABE key to the user agent 210. These security policies operate on the user credentials provided by the user agent in step 5 and causes the AAM 312 to generate an ABE key which corresponds to the particular set of attribute values of the entity associated with the user credentials. That is, if, for example, the set of attributes includes {A, B, C, D} and the user credentials are associated with a user that has attributes {A, B}, then a corresponding ABE key for users having attributes {A, B} is generated for the request, e.g., if the user has attributes Department=Accounting (A), and Project=Audit Project XYZ (B), then ABE key 1 is generated based on these attributes and a master ABE key. Thus, a plurality of users, e.g., each user that is part of the accounting department and the audit project XYZ, may make use of the same ABE key 1 if they have the same set of attribute values.

The AAM 312 implements ABE to provide an ABE key which replaces the opaque authorization codes, such as are used in step 7 of FIG. 2 so that the AAM 312 does not need to maintain a mapping between authorization codes and attributes of the user agent 210 or user. Instead, this mapping is embedded in the ABE mechanisms which issued ABE keys based on attributes of the entities. The ABE key is used to decrypt locking metadata that is encrypted in accordance with predefined security rules/policies, where the locking metadata is associated with attributes to be placed in access and/or ID tokens used to authenticate parties, such as user agent 210. The ABE key embeds the authorization policy or policies in the ABE key itself by virtue of the entity (or party) having the ABE key that decrypts the corresponding locking metadata, i.e., the ABE key is issued to authorized entities (parties) based on their credentials, and the ABE key is associated with a particular set of attribute values corresponding to those credentials. The ABE key only is able to decrypt locking metadata that is encrypted using the predefined security rules/policies that specify criteria of attributes for entities/parties. That is, if an ABE key is used to decrypt locking metadata, and the ABE key is one that corresponds to entities having attributes meeting the criteria of a security rule/policy corresponding to the locking metadata, then the ABE key will be able to decrypt the locking metadata and the corresponding attribute-value will be included in the issued tokens.

The attributes used to generate the ABE keys for each user can be different, giving each user different access to attribute-value pairs that can be added to a token, e.g., access and/or ID token. This is the responsibility of the AAM 312 and assigned as stated above in step 7. One attribute may be that a user is in department X and should only be allowed attribute-value pairs for department X. Similarly, another user could be in department Y and only get attribute-value pairs for that department added to a token. Another user may, for some reason, be in both departments X and Y, and be given attribute-value pairs for both departments in the token. Giving users different attributes at ABE key generation time enables the users to be granted a different set of attribute-value pairs for their tokens. This allows implementors to mix and match as they see fit and not need a one to one mapping between a ABE key and rules/policies that the ABE key satisfies. In the microservice architecture, this allows the AAM microservice 312 to be the only service with knowledge about the enterprises rules/policies.

The AAM 312 is provisioned, by the owner of the AAM 312 through manual or automated processes, with a master ABE key for each computing resource owner which is used to generate an ABE key for individual user agents 210 requesting access to the computing resource owner's protected computing resources. It should be appreciated that each AAM 312 may be provisioned separately by their respective owners with corresponding master keys. The ABE key generated by the AAM 312 is provided to the user agent 210 with a redirect to the relying party 220. The user agent 210 uses the redirect URI along with the ABE key to submit the access request to the relying party 220. The relying party 220 sends a token request along with the ABE key to the token issuance microservice 314. The ABE key is used at the token issuance microservice 314 to determine which attribute values to include in the access token and/or ID token issued for use by the relying party 220 in authenticating the user agent 210 to the resource server 240.

That is, locking metadata may be associated with each attribute value for each attribute (also sometimes referred to as an attribute name or attribute key), such as in an attribute-value pair. This locking metadata is an encrypted piece of data, e.g., an arbitrary sequence of bytes, or the attribute-value pair itself. The locking metadata may be encrypted in accordance with security rules/policies that specify that particular ABE keys, corresponding to specific attribute value patterns, are able to decrypt the locking metadata, e.g., "(A and B) or C", where A, B, and C are attribute values. Only requests with ABE keys that correspond to a particular pattern of attribute values will be able to decrypt the locking metadata successfully, i.e., the plaintext of the ciphertext is accessed.

Thus, the ABE key is used to decrypt the locking metadata. If the associated locking metadata of an attribute-value pair can be successfully decrypted with the ABE key, then that attribute-value pair may be included in the access token and/or ID token that the token issuance microservice 314 generates and sends back to the relying party 220. In some illustrative embodiments, the attribute-value pairs may themselves be encrypted and the encrypted attribute-value pairs may be regarded as the locking metadata.

The access/ID tokens, also referred to as authentication tokens, may be generated with contents that include the attribute-value pairs whose locking metadata was able to be successfully decrypted using the ABE key. Thus, the token issuance microservice 314 does not need to keep a mapping of authorization codes with attributes, but instead, through the ABE mechanism itself, is able to identify which attribute-value pairs are to be included in the authentication token(s) based on which attribute-value pairs have their locking metadata decrypted. Hence neither the AAM 312 nor the token issuance microservice 314 maintains a mapping of attributes to authentication codes. Instead, the AAM 312 implements ABE security rules to determine whether to issue an ABE key, and separately the token issuance microservice 314 uses the ABE key to decrypt locking metadata associated with attribute-value pairs to determine what attributes to include in issued tokens. Hence, even if an attacker were able to compromise one of the microservices 312, 314 of the distributed authentication system 310, the attacker would not be able to gain access any mapping between credentials and ABE keys, ABE keys and attributes values, or ultimately to the protected computing resources. Thus, by using ABE keys and mechanisms to determine which attribute values to include in the authentication token(s), e.g., access token and ID token, rather than using opaque authorization codes requiring providers to maintain mappings, providers do not need to maintain the attribute values and map the attribute values to authorization codes. Instead the work of determining what attribute values to include in authentication tokens may be offloaded to the token issuance microservice 314 which does so automatically based on the ABE key and which locking metadata is able to be decrypted.

The ABE key based authentication mechanisms, e.g., AAM 312 and token issuance microservice 314, of the illustrative embodiments are able to separate a monolithic authentication server, such as 230 in FIG. 2, into separate microservices 312 and 314 which makes compromise of the authentication mechanisms, provided by the other microservices, much more difficult for attackers. The AAM 312 is provisioned with a master ABE key for issuing ABE keys to requestors based on credential authentication in accordance with predefined security policies or rules. The token issuance microservice 314 is provisioned, again by an owner of the token issuance microservice 314 either through manual or automated processes, with data and logic for issuing authentication tokens, e.g., access tokens and ID tokens, having attribute-value pairs determined based on ABE key based decryption of locking metadata.

In a first provisioning operation, the token issuance microservice 314 is provisioned with attributes to include in the access token and ID token. The attributes may be stored as attribute-value pairs which may be associated with locking metadata, where the attributes may be JWT attributes, and the values may be any suitable values for those corresponding attributes. The locking metadata may be any small, encrypted data structure that embeds the rules/policies within this encrypted data structure, or ciphertext. The ability to decrypt the locking metadata proves that the ABE key contains the one or more attribute values that meet the rules/policy for adding the attribute value to the acquired access token and ID token. This metadata may be, for example, any arbitrary sequence of bytes, as the content of the metadata, in some illustrative embodiments, may be considered irrelevant to the "locking" function it serves as part of the ABE key mechanism. That is, as long as the ABE key can be used to decrypt the locking metadata, the fact that the decryption itself is performed successfully is an indicator that the corresponding attribute value should be included in the corresponding issued authentication token(s), e.g., access token and/or ID token.

In some cases, the encrypted locking metadata may be the attribute value or attribute-value pair itself rather than the arbitrary sequence of bytes, as noted above. The content of the locking metadata is discarded after the attempt to decrypt the locking metadata by the token issuance microservice 314 and is only used as the access control for adding key value pairs to the authentication token issued by the token issuance microservice and returned to the relying party 220 as part of step 11. In this case, the attribute value pairs encrypted in the ABE key are the attributes to add to the tokens.

In a second provisioning operation, the AAM 312 is provisioned with a master ABE key. The master ABE key is provisioned on the AAM 312 so that it can generate ABE keys (see Step 7 of FIG. 3). As noted above, more than one AAM 312 may be present, although only one AAM 312 is shown in FIG. 3. Each AAM 312 may be associated with a different corresponding resource owner, or user agent of a resource owner, and may operate with the token issuance microservice 314 or there may be a different pair of AAM 312 and token issuance microservice 314 for each resource owner. Each resource owner may protect the master ABE key maintained at the corresponding AAM 312 according to their own security policies. Each resource owner may issue ABE keys via the AAM 312, which are then used with the corresponding token issuance microservice 314 to issue appropriate authentication tokens, e.g., access tokens and/or ID tokens, having contents corresponding to attribute-value pairs whose locking metadata are able to be decrypted using the ABE key. Each resource owner's token issuance security policies or rules may still be protected with appropriate encryption, as well as the resource owner's attribute-value pairs, where these data can only be unlocked with a ABE key from the resource owner that owns the locking metadata and the master ABE key. ABE keys issued by one resource owner cannot decrypt locking metadata of other resource owners because the ABE keys are generated by a different master ABE key and possibly different AAMs 312.

Assuming that a user agent provides authenticated credentials in step 5 and a corresponding AAM 312 generates an ABE key based on the master ABE key for the resource owner (step 7), the ABE key is returned to the user agent 210 along with a redirect to the relying party (step 8), e.g., a redirect URI. The user agent 210 uses the redirect URI to send the ABE key to the relying party 220 (step 9) which in turn sends a request for a token along with the ABE key to the token issuance microservice 314 (step 10). The token issuance microservice 314 uses the ABE key to attempt to decrypt the locking metadata of each attribute-value pair maintained in the token issuance microservice 314. For those attribute-value pairs whose locking metadata is able to be decrypted by the provided ABE key, the attribute value pairs are included in the content of the returned authentication token(s), e.g., access token(s) and ID token (step 11). The access token and ID token with the attribute-value pairs whose locking metadata were able to be decrypted are returned to the relying party 220 (step 11). The relying party 220 then performs steps 12 and 13 similar to FIG. 2 by requesting access to the protected computing resources and the resource server 240 returning the requested computing resources. The use of the attribute-value pairs by the relying party is implementation dependent based on the particular resource server. For example, these attribute-value pairs may be used to determine if the token is scoped for access to the resource or any other function the resource server sees fit. The locking metadata may be created by the owner of the policies for the particular enterprise and given to the token issuance microservice out-of-band.

In some illustrative embodiments, the ABE key sent from the relying party 220 can also be replaced with a ciphertext. In these illustrative embodiments, the locking metadata may itself be replaced with an ABE key for entities whose attributes meet the requirements of the security rules/policies. Thus, in these illustrative embodiments, the test becomes attempting to decrypt the ciphertext with each ABE key associated with each of the attribute values, however, the overall mechanics described above are similar. If the ciphertext sent from the relying party 220 to the token issuance microservice 314 is able to be decrypted by an ABE key (locking metadata in this illustrative embodiment), the corresponding attribute-value pair may be added to the token(s) issued by the token \issuance microservice 314.

Figure 4:
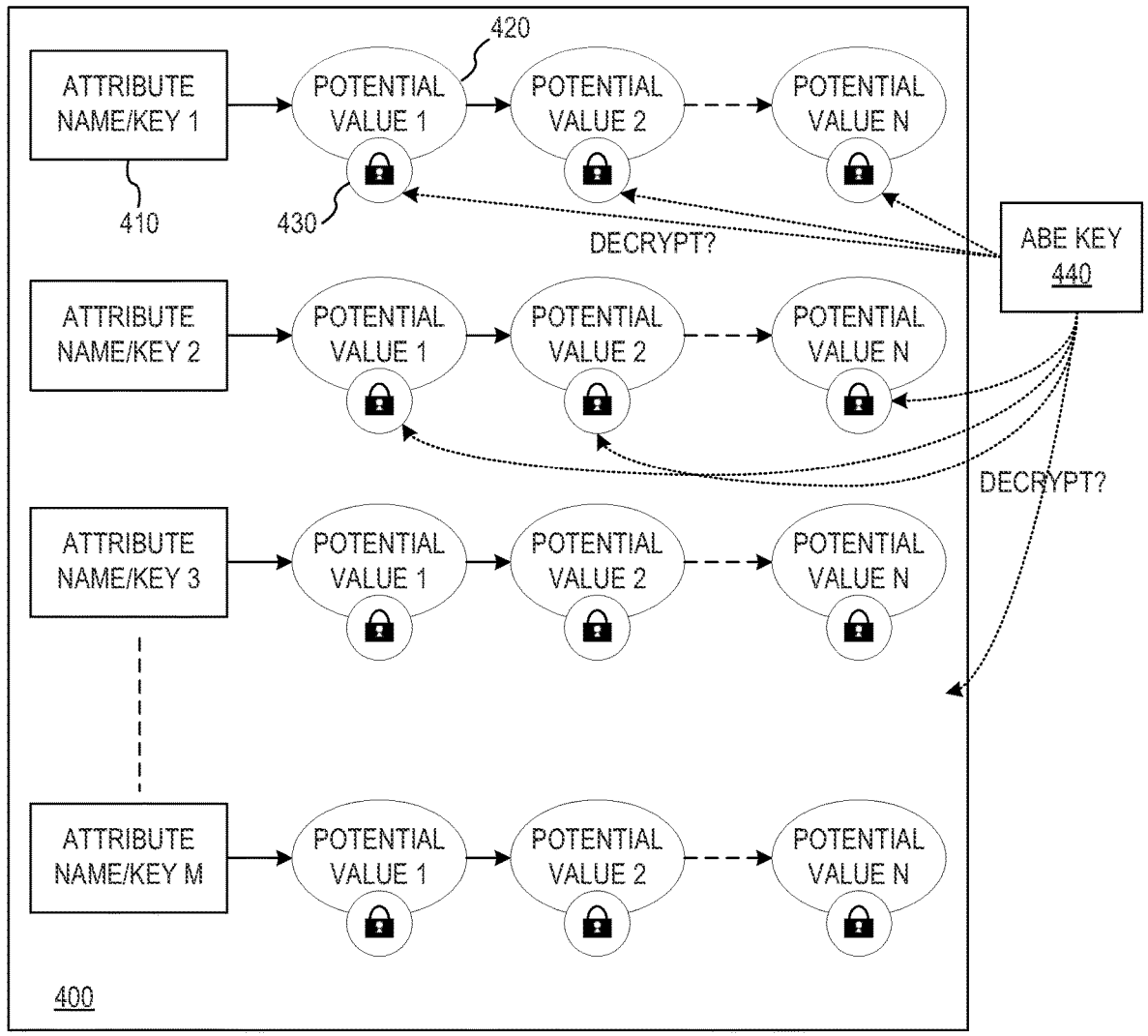
FIG. 4 is an example diagram illustrating an attribute name/key to attribute value listing data structure with corresponding locking metadata in accordance with one illustrative embodiment.

As mentioned previously, in some illustrative embodiments, the attribute name may point to a list of attribute values with accompanying locking metadata that is used test for which attribute value the attribute should contain or if multiple values should be included. That is, the ABE key may be used to decrypt one or more pieces of locking metadata in the list of attribute values and the corresponding attribute values associated with the decrypted pieces of locking metadata may be included in the issued token. FIG. 4 is an example diagram illustrating an attribute name/key to attribute value listing data structure with corresponding locking metadata in accordance with one illustrative embodiment.

As shown in FIG. 4, an encrypted attribute name/key-attribute value listing data structure 400 may be maintained by the token issuance microservice 314. The encrypted attribute name/key-attribute value listing data structure 400 includes a listing of attribute names, or attribute keys, 410 which have associating listings of one or more potential attribute values 420 for the corresponding attribute name/key 410. Each potential attribute value 420 has associated locking metadata 430 which can be decrypted by a corresponding ABE key 440. It should be appreciated that any given locking metadata can be unlocked with multiple ABE keys in some implementations. The ABE key just needs to have the correct attributes to unlock the locking metadata, in accordance with the ABE mechanisms.

The security policy and master ABE key implemented by the AAM 312 causes the AAM 312 to issue ABE keys only to user agents 210 of users whose credentials satisfy security policies/rules, with the issued ABE keys being dependent upon the particular attributes associated with the entity corresponding to the authenticated credentials. These ABE keys can be used to decrypt one or more of the locking metadata 430. The act of successfully decrypting locking metadata 430 associated with a potential attribute value 420 causes the potential value to be included in the issued token(s), as part of the attribute name/key-value pair in the content of the issued token(s). This can be done with each attribute name/key 410 such that multiple attribute name/key-value pairs may be included in the issued token(s), and in some cases, the same attribute name/key 410 may have multiple potential attribute values 420 that are included due to their locking metadata 430.

In some illustrative embodiments, the encrypted locking metadata 430 may comprise encrypted versions of the attribute name/key-attribute value pairs themselves. That is, rather than the potential attribute value 420 being separate data from the locking metadata 430, the potential attribute value 420 may be encrypted, or encrypted along with the attribute name/key 410, to generate an encrypted locking metadata 430. Thus, if the locking metadata 430 is able to be decrypted with the ABE key 440, the token issuance microservice 314 gains access to the decrypted attribute name/key-value pair which can then be added to the issued token(s). Thus, unlike the illustrative embodiments where the encrypted locking metadata 430 are arbitrary sequences of bytes, the encrypted locking metadata 430 of these illustrative embodiments are encrypted versions of the attribute name/key-value pairs (attribute name/value) which has the advantage of hiding both the attribute name/key and its value from attackers that can penetrate the token issuance microservice 314 of the distribute authentication system 310.

As noted above, the mechanisms of the illustrative embodiments which replace the opaque authorization code of the OAuth2/OIDC architecture, which requires a specific mapping of attributes to authorization code, with an ABE key mechanism have the advantages of being able to offload token issuance to a separate microservice from the authentication and authorization service and functionality, making it more difficult for attackers to be able to gain access to protected computing resources. The illustrative embodiments further provide mechanisms to obfuscate the security policies and rules by embedding them in the ABE key by virtue of the ABE mechanisms issuing ABE keys only to entities whose attributes satisfy the security policies and rules. That is, if an attacker gains access to an ABE key, they still will not be able to determine the security policies and rules that lead to the issuance of the ABE key. Moreover, the illustrative embodiments obfuscate the attributes values that are able to access computing resources by implementing locking metadata on attribute values that can only be decrypted with appropriate ABE keys. Thus, without appropriate ABE keys, which again will only be issued to entities having the correct combination of attributes, an attacker will not be able to determine which attribute values are authorized to access the protected computing resources even if the attacker is able to gain access to the token issuance microservice 314. Moreover, when the token issuance microservice 314 makes decisions as to what attribute name/key-value pairs (e.g., claims) are added to issued tokens, the token issuance microservice 314 simply tries to decrypt the locking metadata associated with the potential attribute value (claim), instead of needing complex database queries to find attributes, as in the case of authentication codes used by monolithic authentication servers.

It should be appreciated that the operational components of the distributed authentication system 310 shown in FIG. 3 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention. That is, even though a "user" is referenced in FIG. 3, this is merely referencing the entity being authenticated. The actual data messages sent between the depicted entities are automatically generated by the associated computing devices as data messages, potentially in response to a user input, but otherwise generated and transmitted automatically. The invention is specifically directed to the automatically operating computer components directed to improving the way that entity authentication is performed so as to improve the security of the authentication system and provide a specific solution to the problems of monolithic authentication services noted above. The mechanisms of the improved computing tool and improved computing tool functionality of the illustrative embodiments cannot be practically performed by human beings as a mental process, and are not directed to organizing any human activity.

Figure 5:
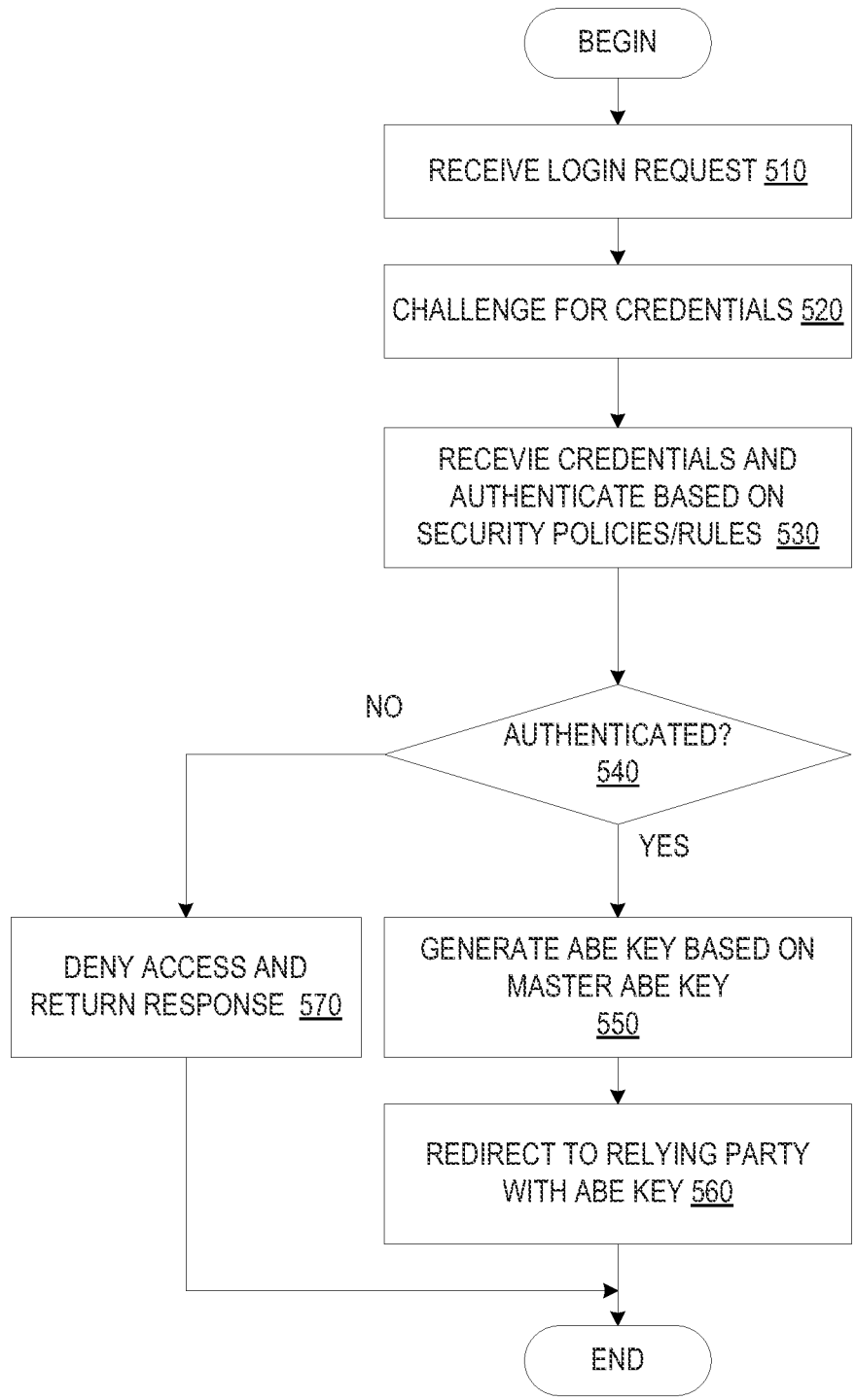
FIG. 5 is a flowchart outlining an operation of an authentication and authorization microservice in accordance with one illustrative embodiment.
Figure 6:
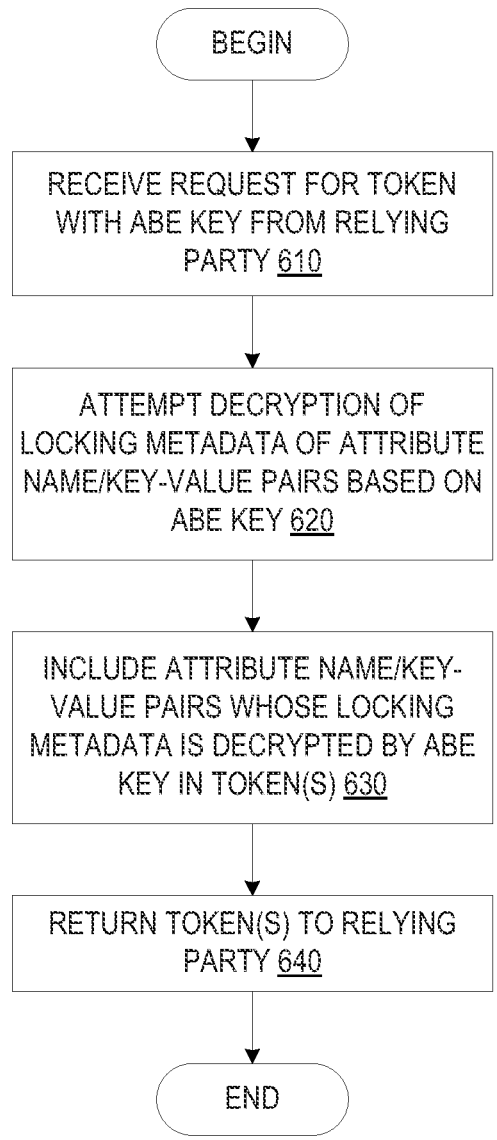
FIG. 6 is a flowchart outlining an operation of a token issuance microservice in accordance with one illustrative embodiment.

FIGS. 5-6 present flowcharts outlining example operations of elements of the present invention with regard to one or more illustrative embodiments. It should be appreciated that the operations outlined in FIGS. 5-6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 5-6, and may, in some cases, make use of the results generated as a consequence of the operations set forth in FIGS. 5-6, the operations in FIGS. 5-6 themselves are specifically performed by the improved computing tool in an automated manner.

FIG. 5 is a flowchart outlining an operation of an authentication and authorization microservice (AAM) in accordance with one illustrative embodiment. As shown in FIG. 5, the operation starts with receiving a login request, e.g., step 3 in FIG. 3 (step 510). The AAM challenges the user agent for credentials specifying the entity requesting access to computing resources (step 520). The received credentials are then authenticated based on established security policies/rules to ensure that the credentials satisfy the security policy/rules for generating/issuing an ABE key to the user agent (step 530). A determination is made as to whether the credentials are authenticated (step 540). If not, then access is denied and an appropriate response is returned to the user agent (step 570). If the credentials are authenticated, then an ABE key is generated based on the master ABE key (step 550). A redirect is then returned to redirect the user agent to the relying party, along with the generated ABE key (step 560). The user agent then executes the redirect to the relying party and provides the ABE key, e.g., step 9 in FIG. 3. The operation then terminates.

FIG. 6 is a flowchart outlining an operation of a token issuance microservice in accordance with one illustrative embodiment. As shown in FIG. 6, the operation starts with receiving a request, along with the ABE key, for a token, where this request is sent from the relying party, e.g., step 10 in FIG. 3 (step 610). The received ABE key is then used as a decryption key to attempt to decrypt the locking metadata for potential values for attribute names/keys (step 620). The attribute name/key-value pairs whose locking metadata is able to be decrypted with the ABE key are then selected and included in the token(s) generated by the token issuance microservice (step 630). The generated token(s) are then returned to the relying party (step 640). Thereafter, the relying party uses these tokens to access the protected computing resources at the resource server, e.g., steps 12 and 13 in FIG. 3. The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for computing resource access security, the method comprising:
    authenticating, by authentication and authorization logic of the data processing system, a credential of a user agent to determine if the user agent is associated with an entity for which an attribute based encryption (ABE) key is to be generated;
    generating, by the authentication and authorization logic, in response to determining that the user agent is associated with the entity for which an ABE key is to be generated, the ABE key and providing the ABE key to the user agent, wherein the ABE key corresponds to a set of attributes of the entity;
    receiving, by a token issuance logic of the data processing system, a token request and the ABE key from a relying party computing device;
    executing a decryption operation, by the token issuance logic, on locking metadata associated with at least one attribute value, based on the ABE key; and
    issuing, by the token issuance logic, in response to the decryption operation successfully decrypting the locking metadata, a generated token to the relying party computing device based on the at least one attribute value, wherein the relying party computing device accesses the computing resources using the generated token.

2. The method of claim 1, further comprising provisioning the token issuance logic with attributes and corresponding candidate attribute values as attribute-value pairs, and wherein each candidate attribute value of each attribute-value pair is associated with a corresponding locking metadata.

3. The method of claim 2, wherein provisioning the token issuance logic with attributes and corresponding candidate attribute values comprises:
    storing, in an attribute-value data structure, a plurality of attribute names;
    storing, in the attribute-value data structure, for each attribute name in the plurality of attribute names, a list of candidate attribute values for the attribute name; and
    storing, in the attribute-value data structure, for each candidate attribute value in each list of candidate attribute values for each attribute name, a corresponding locking metadata that is encrypted such that only ABE keys of authorized user agents corresponding to the candidate attribute values can decrypt the corresponding locking metadata.

4. The method of claim 1, wherein the locking metadata is an arbitrary sequence of bytes that is encrypted such that a valid ABE key decrypts the locking metadata.

5. The method of claim 1, wherein the locking metadata is an attribute-value pair corresponding to the locking metadata, which is encrypted such that a valid ABE key decrypts the locking metadata.

6. The method of claim 1, further comprising provisioning the authentication and authorization logic with a plurality of master ABE keys, wherein the ABE key is generated based on a corresponding master ABE key in the plurality of master ABE keys.

7. The method of claim 6, wherein each master ABE key is associated with a different computing resource owner, and wherein ABE keys, generated based on a first master ABE key associated with a first provider of computing resources, cannot decrypt locking metadata corresponding to ABE keys generated based on a second master ABE key associated with a second computing resource owner.

8. The method of claim 1, wherein:
the ABE key is a ciphertext,
each locking metadata associated with each attribute value in the at least one attribute value comprises a corresponding second ABE key,
executing the decryption operation comprises attempting to decrypt the ciphertext of the ABE key with each locking metadata associated with each attribute value in the at least one attribute value, and
issuing the generated token comprises generating the generated token by incorporating one or more attribute values of the at least one attribute value in the generated token in response to the corresponding second ABE keys of the one or more attribute values successfully decrypting the ciphertext.

9. The method of claim 1, wherein issuing the generated token comprises generating the token at least by including, in the token, the at least one attribute value in response to the decryption operation being successful, and wherein the token is one of an access token or an ID token.

10. The method of claim 9, wherein the token is a JavaScript Object Notation Web Token (JWT), and wherein the at least one attribute value comprises at least one claim of the JWT.

11. The method of claim 1, wherein the authentication and authorization logic is a first microservice executing on a first computing device of the data processing system, and wherein the token issuance logic is a second microservice executing on one of the first computing device or a second computing device different from the first computing device.

12. The method of claim 1, further comprising:
provisioning the token issuance logic with attributes and attribute values that are candidates for inclusion in tokens as candidate attribute-value pairs;
provisioning the authentication and authorization logic with a master ABE key from which to generate ABE keys, wherein issuing the generated token to the relying party computing device based on the at least one attribute value comprises generating the token to include the at least one attribute value from a subset of the candidate attribute-value pairs, and wherein the ABE key is generated based on the master ABE key.

13. A computer program product comprising a computer readable storage medium having a computer readable program stored therein, wherein the computer readable program, when executed in a data processing system, causes the data processing system to:
authenticate, by authentication and authorization logic of the data processing system, a credential of a user agent to determine if the user agent is associated with an entity for which an attribute based encryption (ABE) key is to be generated;
generate, by the authentication and authorization logic, in response to determining that the user agent is associated with the entity for which an ABE key is to be generated, the ABE key and providing the ABE key to the user agent, wherein the ABE key corresponds to a set of attributes of the entity;
receive, by a token issuance logic of the data processing system, a token request and the ABE key from a relying party computing device;
execute a decryption operation, by the token issuance logic, on locking metadata associated with at least one attribute value, based on the ABE key;
issue, by the token issuance logic, in response to the decryption operation successfully decrypting the locking metadata, a generated token to the relying party computing device based on the at least one attribute value, wherein the relying party computing device accesses the computing resources using the generated token.

14. The computer program product of claim 13, wherein the computer readable program further causes the data processing system to provision the token issuance logic with attributes and corresponding candidate attribute values as attribute-value pairs, and wherein each candidate attribute value of each attribute-value pair is associated with a corresponding locking metadata.

15. The computer program product of claim 14, wherein provisioning the token issuance logic with attributes and corresponding candidate attribute values comprises:
storing, in an attribute-value data structure, a plurality of attribute names;
storing, in the attribute-value data structure, for each attribute name in the plurality of attribute names, a list of candidate attribute values for the attribute name; and
storing, in the attribute-value data structure, for each candidate attribute value in each list of candidate attribute values for each attribute name, a corresponding locking metadata that is encrypted such that only ABE keys of authorized user agents corresponding to the candidate attribute values can decrypt the corresponding locking metadata.

16. The computer program product of claim 13, wherein the locking metadata is an arbitrary sequence of bytes that is encrypted such that a valid ABE key decrypts the locking metadata.

17. The computer program product of claim 13, wherein the locking metadata is an attribute-value pair corresponding to the locking metadata, which is encrypted such that a valid ABE key decrypts the locking metadata.

18. The computer program product of claim 13, wherein the computer readable program further causes the data processing system to provision the authentication and authorization logic with a plurality of master ABE keys, wherein the ABE key is generated based on a corresponding master ABE key in the plurality of master ABE keys.

19. The computer program product of claim 18, wherein each master ABE key is associated with a different computing resource owner, and wherein ABE keys, generated based on a first master ABE key associated with a first provider of computing resources, cannot decrypt locking metadata corresponding to ABE keys generated based on a second master ABE key associated with a second computing resource owner.

20. The computer program product of claim 13, wherein:
the ABE key is a ciphertext,
each locking metadata associated with each attribute value in the at least one attribute value comprises a corresponding second ABE key,
executing the decryption operation comprises attempting to decrypt the ciphertext of the ABE key with each locking metadata associated with each attribute value in the at least one attribute value, and
issuing the generated token comprises generating the generated token by incorporating one or more attribute values of the at least one attribute value in the generated token in response to the corresponding second ABE keys of the one or more attribute values successfully decrypting the ciphertext.

21. The computer program product of claim 13, wherein issuing the generated token comprises generating the token at least by including, in the token, the at least one attribute value in response to the decryption operation being successful, and wherein the token is one of an access token or an ID token.

22. The computer program product of claim 21, wherein the token is a JavaScript Object Notation Web Token (JWT), and wherein the at least one attribute value comprises at least one claim of the JWT.

23. The computer program product of claim 13, wherein the authentication and authorization logic is a first microservice executing on a first computing device of the data processing system, and wherein the token issuance logic is a second microservice executing on one of the first computing device or a second computing device different from the first computing device.

24. The computer program product of claim 13, further comprising:
provisioning the token issuance logic with attributes and attribute values that are candidates for inclusion in tokens as candidate attribute-value pairs;
provisioning the authentication and authorization logic with a master ABE key from which to generate ABE keys, wherein issuing the generated token to the relying party computing device based on the at least one attribute value comprises generating the token to include the at least one attribute value from a subset of the candidate attribute-value pairs, and wherein the ABE key is generated based on the master ABE key.

25. An apparatus comprising:
at least one processor; and
at least one memory coupled to the at least one processor, wherein the at least one memory comprises instructions which, when executed by the at least one processor, cause the at least one processor to:
authenticate, by authentication and authorization logic of the at least one processor, a credential of a user agent to determine if the user agent is associated with an entity for which an attribute based encryption (ABE) key is to be generated;
generate, by the authentication and authorization logic, in response to determining that the user agent is associated with the entity for which an ABE key is to be generated, the ABE key and providing the ABE key to the user agent, wherein the ABE key corresponds to a set of attributes of the entity;
receive, by a token issuance logic of the at least one processor, a token request and the ABE key from a relying party computing device;
execute a decryption operation, by the token issuance logic, on locking metadata associated with at least one attribute value, based on the ABE key;
issue, by the token issuance logic, in response to the decryption operation successfully decrypting the locking metadata, a generated token to the relying party computing device based on the at least one attribute value, wherein the relying party computing device accesses the computing resources using the generated token.

* * * * *